United States Patent
Llanos

[19]

[11] Patent Number: 5,955,114
[45] Date of Patent: Sep. 21, 1999

[54] STICK APPLICATOR

[76] Inventor: Jesus M Llanos, 5220 Northwest 72nd, Bay #1, Miami, Fla. 33166

[21] Appl. No.: 08/831,782

[22] Filed: Apr. 9, 1997

[51] Int. Cl.$^6$ ................................................. A47G 19/18
[52] U.S. Cl. ............................... 425/87; 222/391; 401/12; 401/176
[58] Field of Search ..................... 425/87, 458; 222/391, 222/327, 386; 401/12, 176, 179

[56] References Cited

U.S. PATENT DOCUMENTS

| | | | |
|---|---|---|---|
| 2,138,045 | 11/1938 | Seeberger | 425/87 |
| 2,233,587 | 3/1941 | Crewe | 222/391 |
| 2,884,877 | 5/1959 | Nalbone et al. | 222/391 |
| 3,141,583 | 7/1964 | Mapel et al. | 222/391 |
| 3,178,076 | 4/1965 | Kennedy | 222/391 |
| 3,517,668 | 6/1970 | Brickson | 222/391 |
| 5,421,663 | 6/1995 | Bravo | 22/391 |

*Primary Examiner*—Patrick Ryan
*Assistant Examiner*—Joseph Leyson

[57] ABSTRACT

A stick applicator (10) for extrusion of a butter stick (20) which has a back body (12B) and a hollow front body (12F) having sufficient width to accommodate a butter stick (20) therein. The body (12) further has a removable body tip (12C). A user places the butter stick (20) within the hollow front body (12F) and securely attaches the body tip (12C) thereto prior to extrusion through the body tip opening (12CB). A plunger (14) which has a plurality of plunger shaft teeth (14AA) and a plunger piston (14B) is movably positioned within the front body (12F). A handle (16) which has a handle housing (16A) with a handle trigger (16B) pivotally positioned therein. The handle trigger (16B) has a handle trigger top (16BA) having a handle trigger top ratchet receptacle (16BAA) and a handle trigger top opening (16BAB) therein and a handle trigger ratchet stopper (16BD) positioned at a top end thereof. A ratchet (18) has a ratchet rotator (18A) rotatably positioned within the handle trigger top ratchet receptacle (16BAA). A ratchet pushing member (18C) is attached to a rear distal end of the ratchet shaft (18B). A handle trigger upper spring (16C) is positioned within the handle trigger top opening (16BAB) and the ratchet shaft (18B)

15 Claims, 8 Drawing Sheets

STICK APPLICATOR

BACKGROUND OF THE INVENTION

1. Field of the Invention

The present invention relates to a device for applying butter to various food products. More particularly, the present invention relates to a butter dispenser which functions with stick butter.

2. Description of the Prior Art

Butter dispensers in the past have primarily addressed the problem of dispensing melted butter on to food products. Melted butter in these prior art patents is dispensed with various techniques which depend on the butter being in a soft or liquid state.

Numerous innovations for Stick Applicator have been provided in the prior art that are described as follows. Even though these innovations may be suitable for the specific individual purposes to which they address, they differ from the present invention as hereinafter contrasted.

In U.S. Pat. No. 5,409,533, titled Apparatus for Providing Buttered Toast, invented by Laurence H. Pretty, an apparatus which is intended to apply butter from a mass thereof in solid condition to a slice of bread. A housing contains a transfer member connected with the housing by connecting structure which supports the transfer member for sliding motion. A plurality of openings extends through the transfer member. The transfer member and the mass of butter are moved into contact to cause a portion of the butter to enter the openings. The transfer member and the mass of butter are separated to sever the butter within the openings from the mass of butter to leave the openings at least partially filled with butter. The slice of bread is supported with a surface thereof to be buttered spaced adjacent and facing toward the openings in the transfer member. Gas under pressure is directed through the openings to propel the butter within the openings outwardly therefrom into contact with the surface of the slice of bread.

The patented invention differs from the present invention because the patented invention is a device for dispensing melted butter on to toast. Features common with using stick butter as in the present invention are not disclosed.

In U.S. Pat. No. 5,186,098, titled Apparatus for Buttering and Applying Cheese Topping to Bread, invented by Danny T. Miller, a table-top apparatus for conveying small loaves of bread beneath a liquid applicator and a dry particle dispenser. As bread is conveyed along an upper conveyor, butter, margarine, or the like is applied by a liquid applicator. The bread then drops to a lower conveyor and is topped with grated cheese and/or seasonings from a dry particle hopper. The conveyors and the liquid applicator are run continuously. An agitator within the dry particle hopper is only run when bread moving along the lower conveyor trips a limit switch.

The patented invention differs from the present invention because the patented invention is a device for applying melted butter to the tops of loaves of bread moving on a conveyer belt. The patented invention lacks features common to the present invention.

In U.S. Pat. No. 4,301,762, titled Corn buttering Device, invented by Jackson S. Burnett, Jr. a corn buttering device for applying a coating of butter or butter substitute to an ear of corn comprising a pan for containing a heated liquid and a receptacle mounted in the pan for containing liquid butter. The pan is provided with a cover which has a recessed upper surface for receiving and supporting an ear of corn therein. The recess in the cover is provided with an elongate slot which communicates with the butter receptacle when the cover is moved downwardly to tilt the receptacle and cause butter to pour through the recess slot and contact an ear of corn. The recess slot is normally closed by a movable wall member which is displaced from the slot during downward movement of the cover on the pan. The cover containing an ear of corn therein is maintained in an upper position on the pan until manually displaced to a lowermost position for applying butter to the corn.

The patented invention differs from the present invention because the patented invention is table top device for applying melted butter to an ear of corn. A pan contains a heated liquid and a second container mounted in the pan for containing butter which is melted by the hot liquid. The features of this invention are not common with the present invention.

In U.S. Pat. No. 4,008,681, titled Butter Dispenser, invented by Patrick Steven Johnson, an L-shaped butter dispenser having a heated grid for melting butter. The dispenser is adapted for the melted butter to drip down onto a slanted floor, flow there along and be taken up and dispensed by a rotatable roller near the lower end of said floor.

The patented invention differs from the present invention because the patented invention is a butter dispenser which applies butter via a roller. The user inverts an item to be buttered on top of the roller. A crank attached to the roller is turned rotating the roller past the item applying butter in the process. The present invention is a device for dispensing butter consisting of a gun shaped device having a chamber sized to accept a stick of butter with a nozzle on one end. A rachet piston on the opposite end pushes against the stick of butter when a handle is squeezed. The handle has a squeeze handle with a cog and pivot means. The handle is grasped by an user and squeezed forcing the squeeze handle against a stationary portion of the handle. A cog engages the rachet piston forcing the butter out the nozzle. A cog release means is provided to permit the piston to be withdrawn.

In U.S. Pat. No. D257,117, titled Butter Spreader, invented by Gertrude Steiner, the ornamental design for a butter spreader, is as shown and described.

In U.S. Pat. No. D296,646, titled Corn Cob Butter Cutter and Spreader, invented by Charles A. Yoder, the ornamental design for a corn cob butter cutter and spreader, is as shown and described.

The above two design patents are ornamental design for butter dispensers that do not have features common to the present invention.

Numerous innovations for Stick Applicator have been provided in the prior art that are adapted to be used. Even though these innovations may be suitable for the specific individual purposes to which they address, they would not be suitable for the purposes of the present invention as heretofore described.

SUMMARY OF THE INVENTION

The present invention is a device for dispensing butter consisting of a gun shaped device having a chamber sized to accept a stick of butter with a nozzle on one end. A rachet piston on the opposite end pushes against the stick of butter when a handle is squeezed. The handle has a squeeze handle with a cog and pivot means. The handle is grasped by an user and squeezed forcing the squeeze handle against a stationary portion of the handle. A cog engages the rachet piston forcing the butter out the nozzle. A cog release means is provided to permit the piston to be withdrawn.

The types of problems encountered in the prior art are that butter is difficult to apply in solid stick form. When butter is brought directly from the refrigerator and applied to delicate food products such as bread often the food product is cosmetically damaged. Bread for example tears. The prior art sought relief from this problem by using melted butter however, melted butter id difficult to clean up and requires a heat source for the melting. Both of these are severe disadvantages when using melted butter. The direct use of a stick of butter is not attempted.

In the prior art, unsuccessful attempts to solve this problem were attempted namely devices which apply butter which has been melted. However, the problem was solved by the present invention because a stick of butter directly from the refrigerator can be used.

The present invention went contrary to the teaching of the art, which spreads or applies soft and melted butter, by forcing stick butter through an applicator opening.

The present invention solved a long felt need for a butter applicator which can function with stick butter and stick butter at refrigerator temperatures.

Accordingly, it is an object of the present invention to provide butter in a form that it can be applied to delicate food products directly from cold storage.

More particularly, it is an object of the present invention to provide a butter dispenser which functions with stick type butter packaging.

In keeping with these objects, and with others which will become apparent hereinafter, one feature of the present invention resides, briefly stated, in a body which has a back with a back body opening to receive a plunger.

Another feature of the present invention is that the body has a front which is attached to a body tip.

Yet another feature of the present invention is that the body tip has a body tip opening through which butter is dispensed.

When the stick applicator is designed in accordance with the present invention, butter is applied by squeezing a handle which forces a plunger against the butter stick pushing it toward a body tip opening.

In accordance with another feature of the present invention, the body tip opening is smaller than the cross section of the butter stick resulting in the butter stick being extruded through the body tip opening when the handle is squeezed.

Still another feature of the present invention is that the plunger comprises a plunger shaft which has plunger shaft teeth. The plunger shaft teeth engage a ratchet attached to the handle. As the handle is squeezed by the user the handle trigger rotates about a pivot causing the ratchet pushing member to push on a rachet tooth forcing the plunger against the butter stick.

Yet still another feature of the present invention is that plunger piston pushes the butter stick through a body tip opening causing the butter to be extruded.

Still yet another feature of the present invention is that the body tip opening has a decorative shape permitting decorative application of butter to food products.

Another feature of the present invention is that the ratchet is releasable so the rachet can be disengaged from the plunger shaft teeth.

Yet another feature of the present invention is that when the rachet is released the plunger can be withdrawn to release the butter stick and permit refilling the front body.

Yet another feature of the present invention is that when the rachet is released the plunger can be withdrawn which releases pressure on the butter stick to prevent the butter stick from oozing out through the body tip opening. This is especially desirable when the butter stick is in a very soft condition which occurs after the butter stick has been removed from cold storage for some time.

Still another feature of the present invention is that the handle has a handle housing right top which is securely attached to the a bottom surface of the back body.

Yet still another feature of the present invention is that the handle trigger is returned to a starting position after squeezing by a handle trigger lower spring.

The novel features which are considered characteristic for the invention are set forth in the appended claims. The invention itself, however, both as to its construction and its method of operation, together with additional objects and advantages thereof, will be best understood from the following description of the specific embodiments when read and understood in connection with the accompanying drawings.

DESCRIPTION OF THE PREFERRED EMBODIMENT

The present invention has the following features:
A) chamber sized to accept a stick of butter
B) rachet piston
C) handle having:
  I) squeeze handle with a cog and pivot means
  ii) cog release means
  iii) stationary portion of the handle
D) nozzle through which butter is extruded when the handle is squeezed.

The present invention is a device for dispensing butter. The device consists of a chamber sized to accept a stick of butter with a nozzle on one end. A rachet piston on the opposite end pushes against the stick of butter when a handle is squeezed. The handle has a squeeze handle with a cog and pivot means. The handle is grasped by an user and squeezed forcing the squeeze handle against a stationary portion of the handle. A cog engages the rachet piston forcing the butter out the nozzle. A cog release means is provided to permit the piston to be withdrawn.

Figure 1:
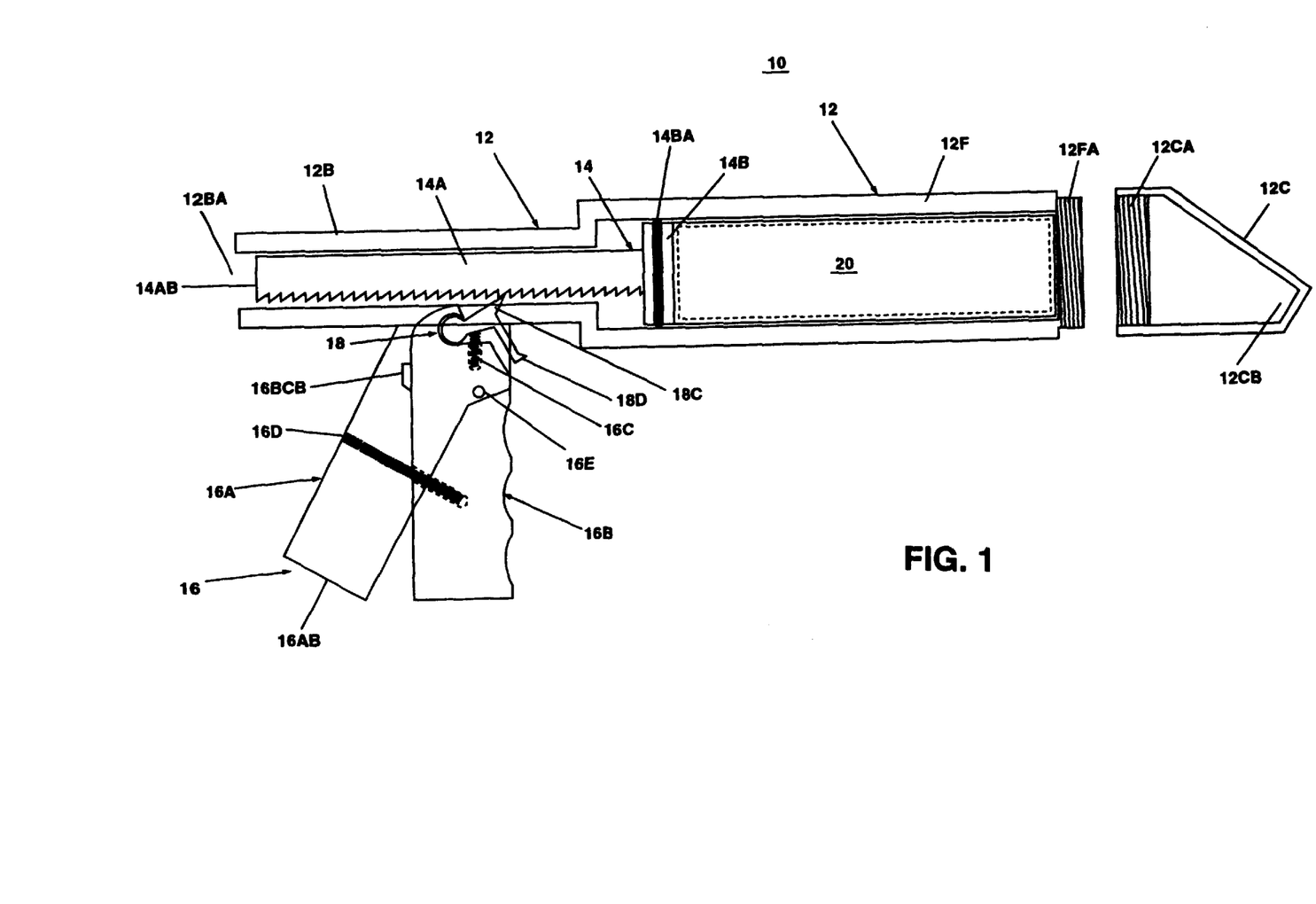
FIG. 1 is a side view of a stick applicator.

Firstly referring to FIG. 1 which is a side view of a stick applicator (10) for extrusion of a butter stick (20). The stick applicator (10) comprises a body (12) which comprises aback body (12B) and a hollow front body (12F). The a body (12) which comprises a back body (12B) have sufficient width to accommodate a butter stick (20) therein. The back body (12B) comprises a back body opening (12BA) through which the plunger shaft rear (14AB) protrudes. The body (12) further comprises a removable body tip (12C). The removable body tip (12C) has a body tip opening (12CB) which is positioned on a front distal end of the front body (12F). The body tip (12C) is angled acutely downwardly toward the body tip opening (12CB) at an angle of preferably thirty-five degrees. The body tip opening (12CB) is preferably rectangular in configuration. The body tip (12C) comprises a body tip fastening means (12CA) positioned at a rear distal end thereof. The body tip fastening means (12CA) has a complimentary configuration to the front body fastening means (12FA) functioning to engageably attach thereto. An user places the butter stick (20) within the hollow front body (12F) and securely attaches the body tip (12C) thereto prior to extrusion through the body tip opening (12CB). The front body (12F) comprises a front body fastening means (12FA) positioned at a front distal end thereof.

The butter stick (20) is a food product. The butter stick (20) is selected from a group consisting of butter, margarine, dough, cheese, and icing. The butter stick (20) has a cross section selected from the group consisting of a polygon, and a curved surface.

The stick applicator (10) further comprises a plunger (14). The plunger (14) comprises a plunger shaft (14A) having a plunger shaft rear (14AB) and plurality of plunger shaft teeth (14AA) positioned on a lower surface thereof. The plunger shaft (14A) is movably positioned within the back body (12B). The plunger shaft (14A) further comprises a plunger piston (14B) which is securely fastened to a front end thereof. The plunger piston (14B) is movably positioned within the front body (12F). The plunger piston (14B) further comprises a plunger piston ring (14BA) circumferentially positioned thereon. The plunger piston ring (14BA) functions to form a seal between the plunger piston (14B) and an inside of the front body (12F).

The stick applicator (10) still further comprises a handle (16). The handle (16) comprises a handle housing (16A) with a handle trigger (16B) pivotally positioned therein. The handle housing (16A) comprises a handle housing bottom (16AB). The handle housing (16A) comprises a handle housing right (16AR) connected to a handle housing left (16AL) by a handle housing rear (16AC). The handle housing right (16AR) comprises a handle housing right top (16ARA) securely attached to a bottom surface of the back body (12B). The handle housing right (16AR) further comprises a handle housing right front (16ARB) having a handle housing right front opening (16ARBA) therein. The handle housing left (16AL) comprises a handle housing left top (16ALA) which is securely attached to a bottom surface of the back body (12B). The handle housing left (16AL) further comprises a handle housing left front (16ALB) having a handle housing left front opening therein. The handle housing right top (16ARA) is at a perpendicular angle to the handle housing left front (16ALB) and the handle housing left top (16ALA) is at a perpendicular angle to the handle housing left front (16ALB).

The handle trigger (16B) comprises a handle trigger top (16BA) having a handle trigger top ratchet receptacle (16BAA) and a handle trigger top opening (16BAB) therein. The handle trigger (16B) further comprises a handle trigger bottom (16BB) and a handle trigger rear (16BC) and a handle trigger ratchet stopper (16BD) positioned at a top end thereof. The handle trigger rear (16BC) comprises a handle trigger rear opening (16BCA) therein. The handle trigger rear opening (16BCA) is at an acute angle of thirty degrees. The handle trigger rear (16BC) further comprises a handle trigger rear stopper (16BCB) which functions to prevent the handle trigger (16B) from fully receding into the handle housing (16A). The handle trigger rear stopper (16BCB) is constructed from a material selected from a group consisting of plastic, plastic composites, rubber and rubber composites.

The stick applicator (10) further comprises a ratchet (18) which comprises a ratchet rotator (18A) that is rotatably positioned within the handle trigger top ratchet receptacle (16BAA). The ratchet (18) further comprises a ratchet shaft (18B) which is attached at a rear distal end to the ratchet rotator (18A) extending outwardly therefrom. The ratchet shaft (18B) comprises a ratchet shaft opening (18BA) therein. A ratchet pushing member (18C) is attached to a rear distal end of the ratchet shaft (18B). A ratchet locking member (18D) is attached to and extends acutely downwardly from the ratchet pushing member (18C).

The stick applicator (10) still further comprises a handle trigger upper spring (16C) which is positioned within the handle trigger top opening (16BAB) and the ratchet shaft (18B). The handle trigger upper spring (16C) functions to push the ratchet (18) upwardly when the handle trigger (16B) is released.

The stick applicator (10) further comprises a handle trigger lower spring (16D) which is positioned within the handle trigger rear opening (16BCA) and the handle housing rear (16AC). The handle trigger lower spring (16D) functions to push the handle trigger (16B) in an outward and released position. When the user squeezes the handle trigger (16B), the handle trigger top (16BA) pushes on top of the ratchet shaft (18B) engaging the ratchet pushing member (18C) into the plunger shaft teeth (14AA) advancing the plunger (14) and concurrently the butter stick (20) forward extruding through the body tip opening (12CB). When the user releases the handle trigger (16B), the handle trigger upper spring (16C) pushes upwardly on the ratchet shaft (18B) disengaging the ratchet pushing member (18C) from the plunger shaft teeth (14AA) and concurrently engaging the ratchet locking member (18D).

The stick applicator (10) still further comprises a handle trigger pivot pin (16E) which is positioned within the handle trigger (16B). The handle housing right front opening (16ARBA), and the handle housing left front opening, and the handle trigger pivot pin (16E) function to pivotally connect the handle housing (16A) to the handle trigger (16B).

The stick applicator (10) is manufactured from a material selected from a group consisting of plastic, plastic composite, metal, metal alloy, rubber, rubber composite, epoxy, fiberglass, and carbon-graphite.

Figure 2A:
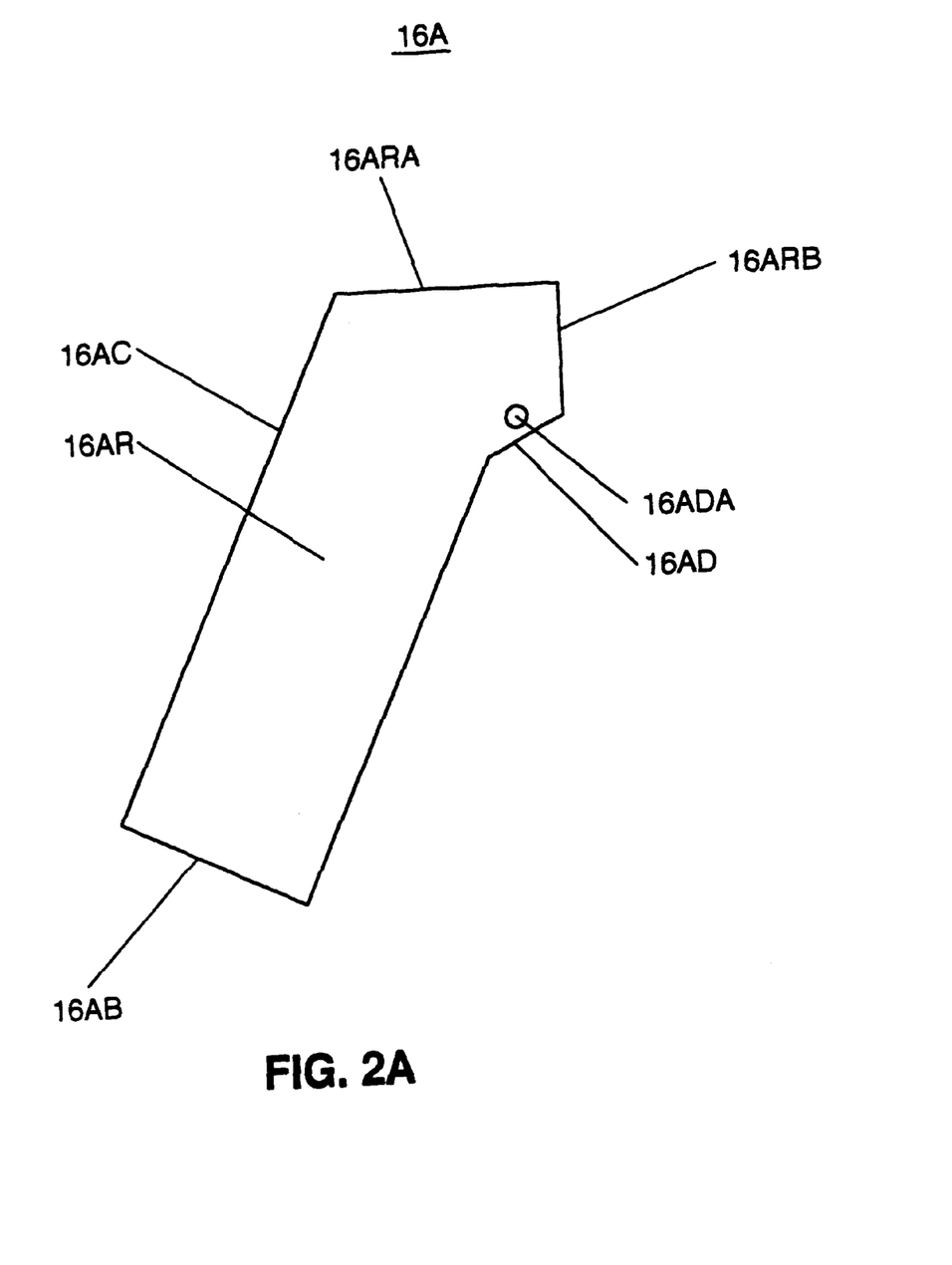
FIG. 2A is a side view of a handle housing rear.
Figure 2B:
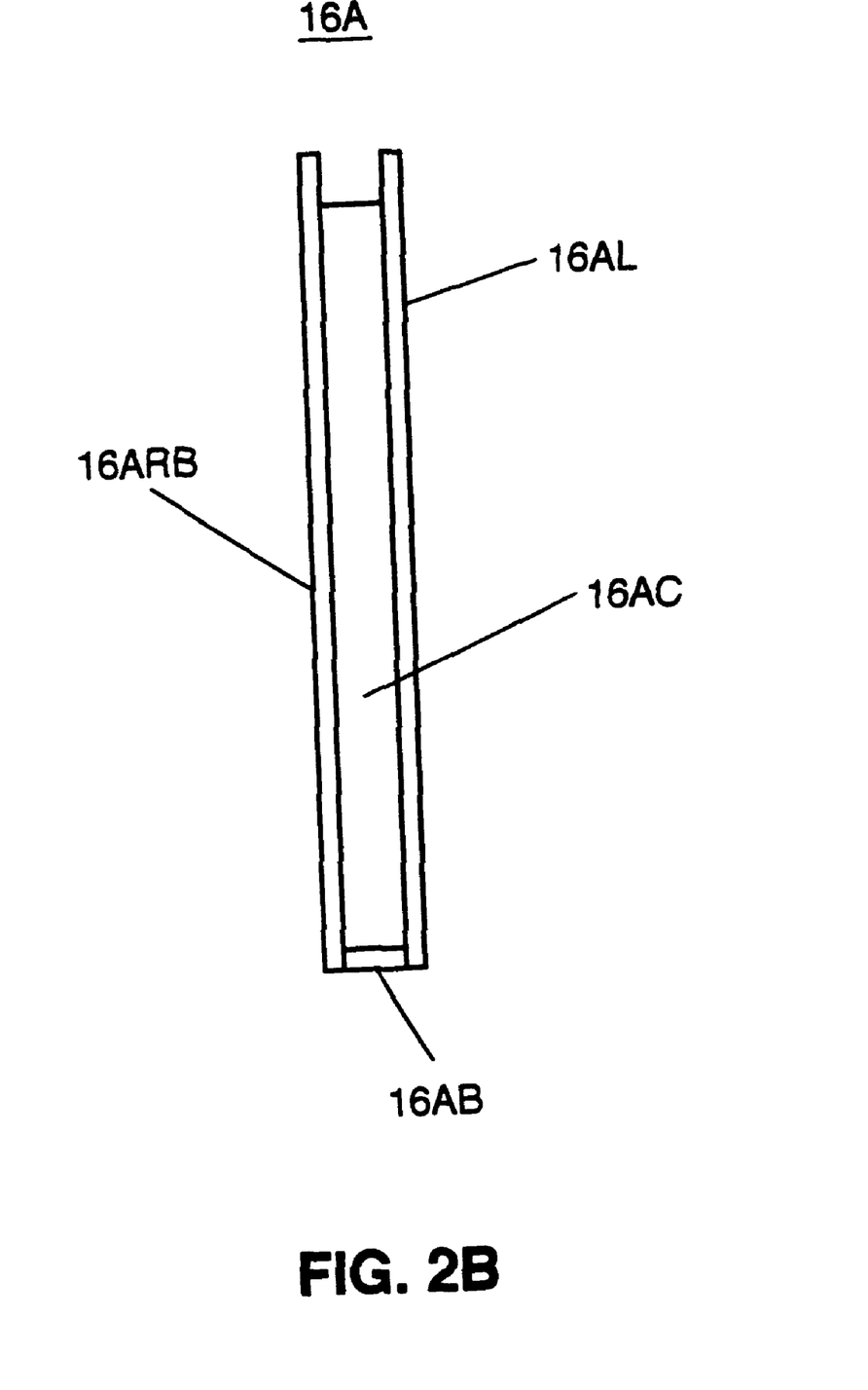
FIG. 2B is a front view of a handle housing rear.

Secondly, referring to FIG. 2A and FIG. 2B which is a side view of a handle housing (16A) and a front view handle housing (16) respectively. The handle housing (16A) comprises a handle housing bottom (16AB). The handle housing (16A) comprises a handle housing right (16AR) connected to a handle housing left (16AL) by a handle housing rear (16AC). The handle housing right (16AR) comprises a handle housing right top (16ARA) securely attached to a bottom surface of the back body (12B). The handle housing right (16AR) further comprises a handle housing right front (16ARB) having a handle housing right front opening (16ARBA) therein. The handle housing left (16AL) comprises a handle housing left top (16ALA) which is securely attached to a bottom surface of the back body (12B). The handle housing left (16AL) further comprises a handle housing left front (16ALB) having a handle housing left front opening therein. The handle housing right top (16ARA) is at a perpendicular angle to the handle housing left front (16ALB) and the handle housing left top (16ALA) is at a perpendicular angle to the handle housing left front (16ALB).

Figure 3A:
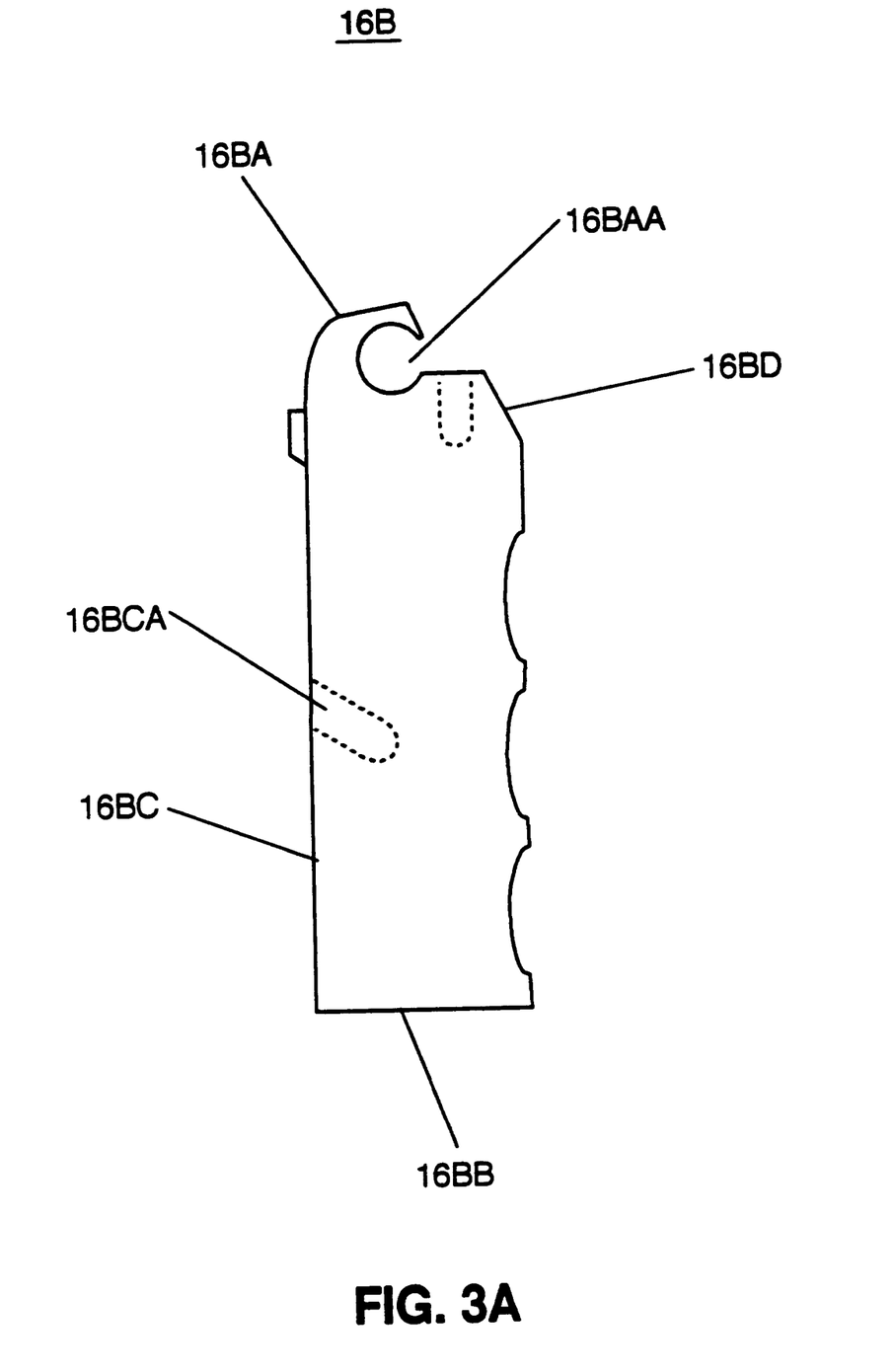
FIG. 3A is a right side view of a handle trigger.
Figure 3B:
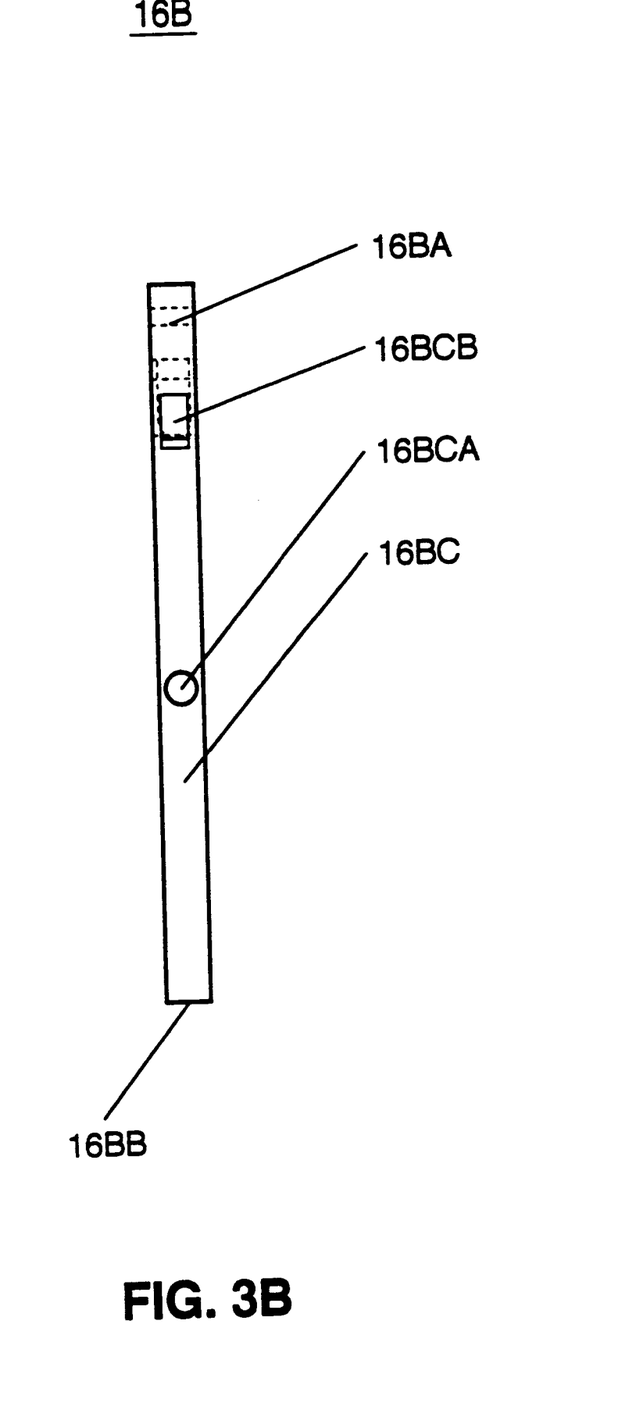
FIG. 3B is a front view of a handle trigger.

Now referring to FIG. 3A and FIG. 3B which is a right side view of a handle trigger (16B) and front view of a handle trigger (16B) respectively. The handle trigger (16B) comprises a handle trigger top (16BA) having a handle trigger top ratchet receptacle (16BAA) and a handle trigger top opening (16BAB) therein. The handle trigger (16B) further comprises a handle trigger bottom (16BB) and a handle trigger rear (16BC) and a handle trigger ratchet stopper (16BD) positioned at a top end thereof. The handle trigger rear (16BC) comprises a handle trigger rear opening (16BCA) therein. The handle trigger rear opening (16BCA) is at an acute angle of thirty degrees. The handle trigger rear (16BC) further comprises a handle trigger rear stopper (16BCB) which functions to prevent the handle trigger (16B) from fully receding into the handle housing (16A). The handle trigger rear stopper (16BCB) is constructed from a material selected from a group consisting of plastic, plastic composites, rubber and rubber composites.

Figure 4A:
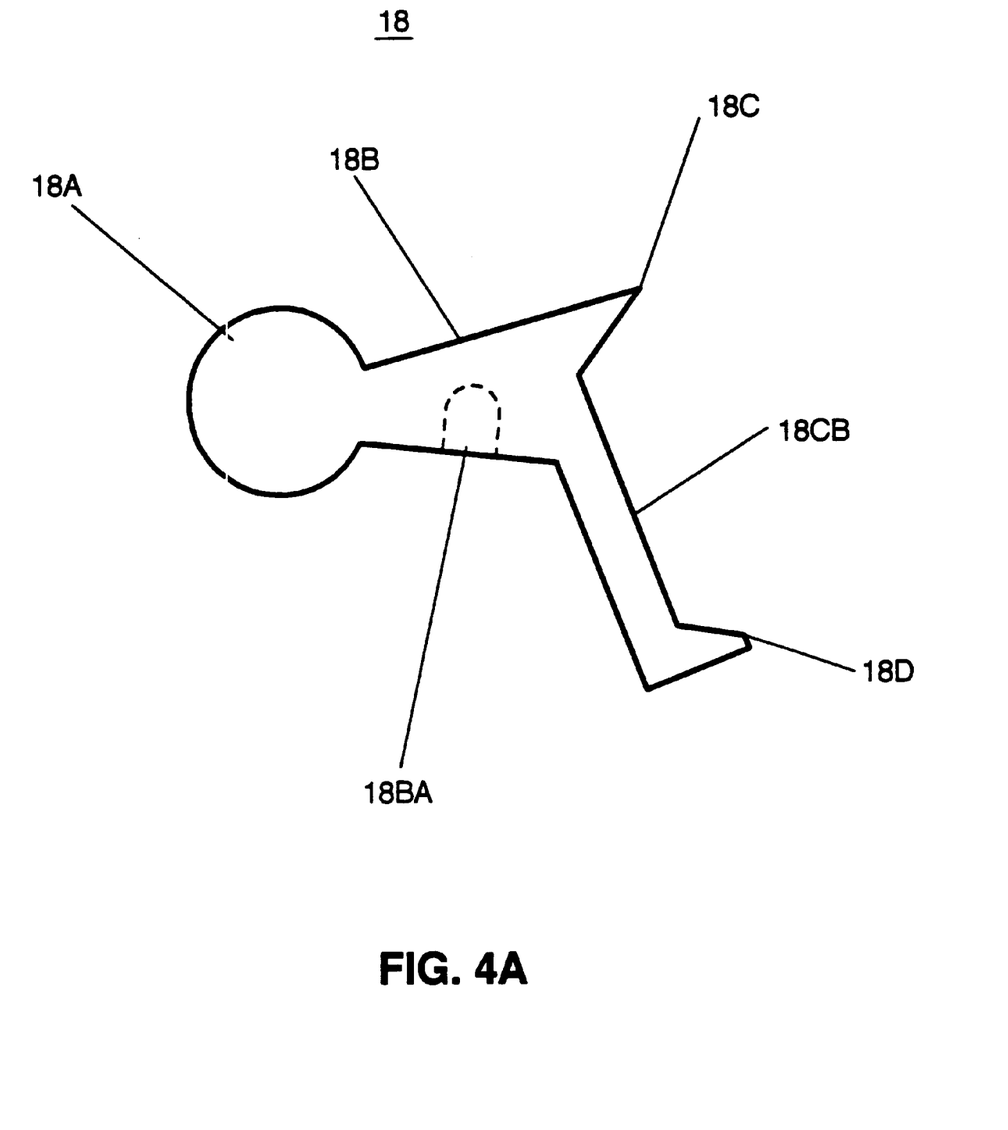
FIG. 4A is a right side view of a ratchet.
Figure 4B:
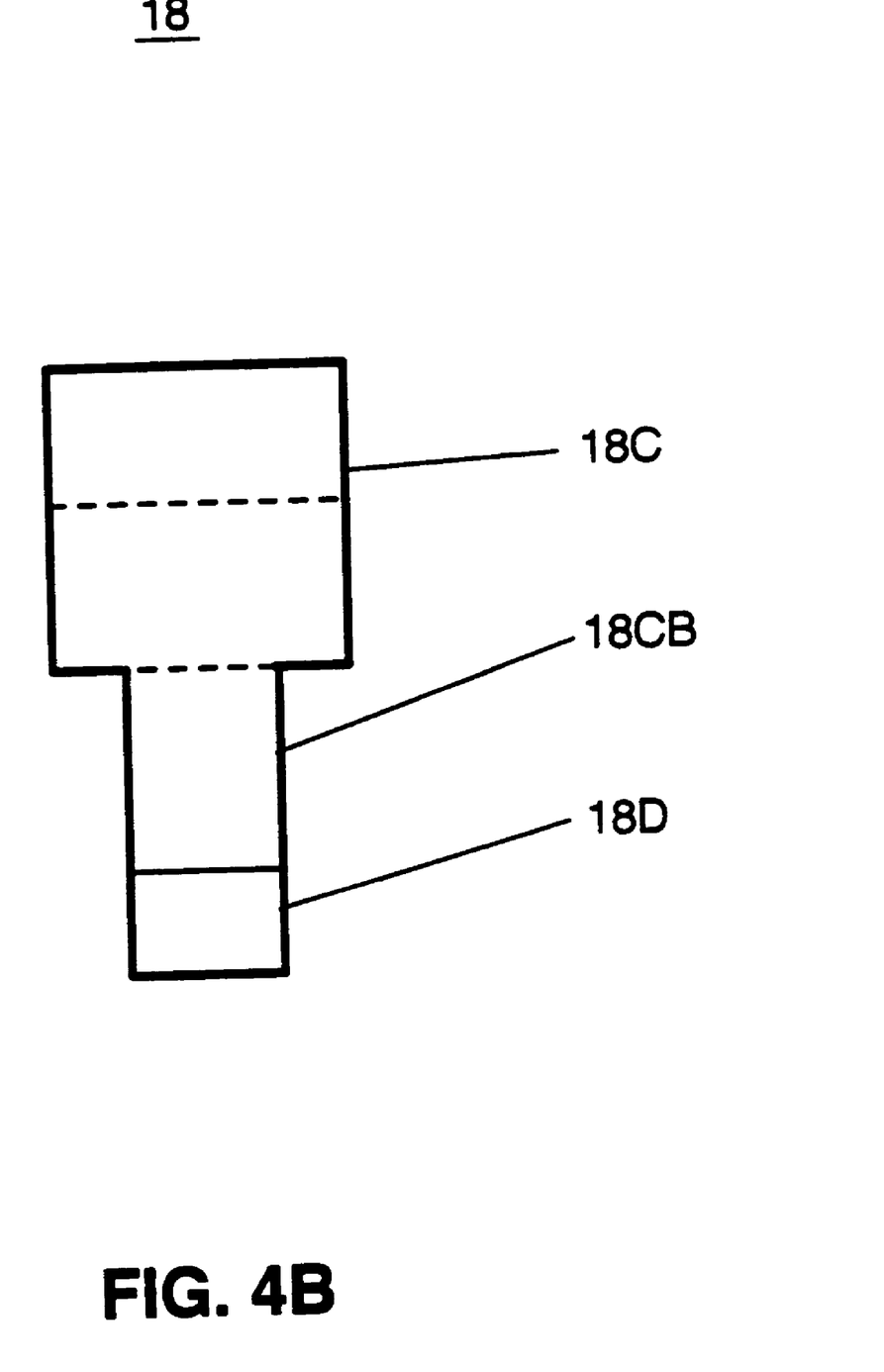
FIG. 4B is a front view of a ratchet.

Now, referring to FIG. 4A which is a right side view of a ratchet (18) and FIG. 4B which is a ratchet (18) respectively. The ratchet (18) comprises a ratchet rotator (18A) that is rotatably positioned within the handle trigger top ratchet receptacle (16BAA). The ratchet (18) further comprises a ratchet shaft (18B) which is attached at a rear distal end to the ratchet rotator (18A) extending outwardly therefrom. The ratchet shaft (18B) comprises a ratchet shaft opening (18BA) therein. A ratchet pushing member (18C) is attached to a rear distal end of the ratchet shaft (18B). A ratchet locking member (18D) is attached to and extends acutely downwardly from the ratchet pushing member (18C).

Figure 5:
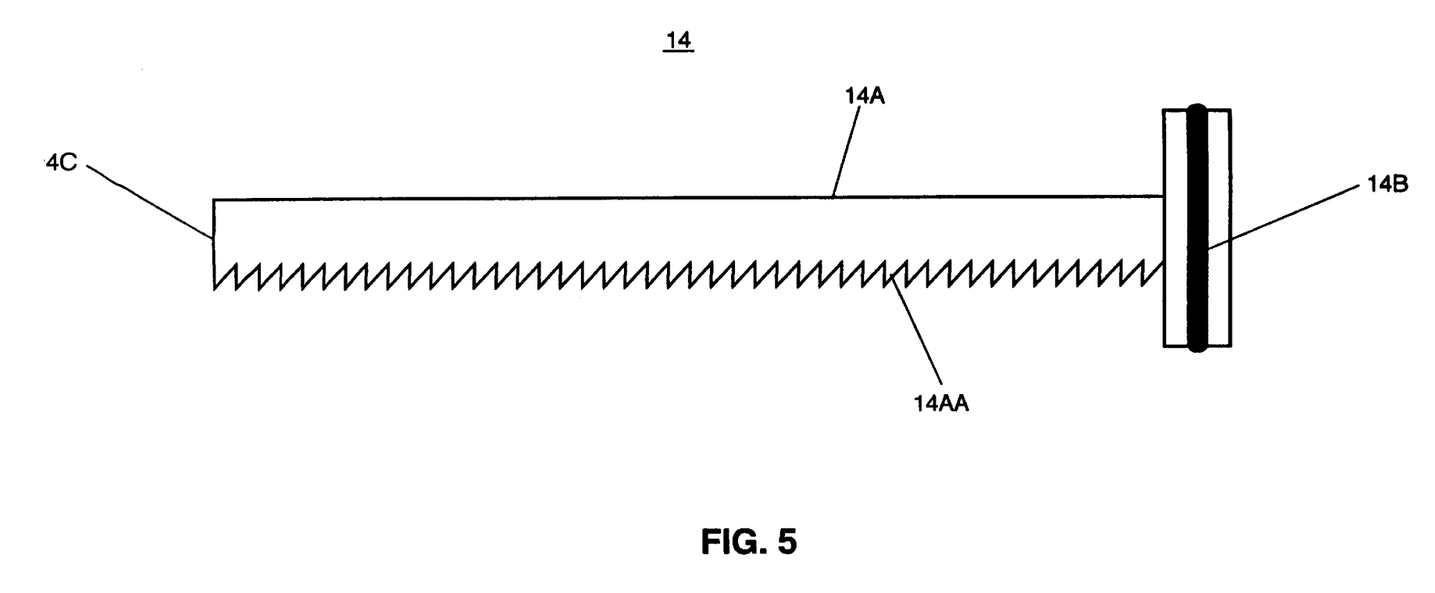
FIG. 5 is a right side view of a plunger.

Now, referring FIG. 5 which is a right side view of a plunger (14). The plunger (14) comprises a plunger shaft (14A) having a plunger shaft rear (14AB) and plurality of plunger shaft teeth (14AA) positioned on a lower surface thereof. The plunger shaft (14A) is movably positioned within the back body (12B). The plunger shaft (14A) further comprises a plunger piston (14B) which is securely fastened to a front end thereof. The plunger piston (14B) is movably positioned within the front body (12F). The plunger piston (14B) further comprises a plunger piston ring (14BA) circumferentially positioned thereon. The plunger piston ring (14BA) functions to form a seal between the plunger piston (14B) and an inside of the front body (12F).

It will be understood that each of the elements described above, or two or more together, may also find an useful application in other types of constructions differing from the type described above.

While the invention has been illustrated and described as embodied in a Stick Applicator, it is not intended to be limited to the details shown, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is desired to be protected by Letters Patent is set forth in the appended claims.

What is claimed is:

1. A stick applicator (10) for extrusion of a butter stick (20), the stick applicator (10) comprising:

A) a body (12) which comprises a back body (12B) and a hollow front body (12F) having sufficient width to accommodate a butter stick (20) therein, the body (12) further comprises a removable body tip (12C), having a body tip opening (12CB), positionable on a front distal end of the front body (12F), an user places the butter stick (20) within the hollow front body (12F) and securely attaches the body tip (12C) thereto prior to extrusion through the body tip opening (12CB);

B) a plunger (14) which comprises a plunger shaft (14A) having a plunger shaft rear (14AB) and plurality of plunger shaft teeth (14AA) positioned on a lower surface thereof, the plunger shaft (14A) is movably positioned within the back body (12B), the plunger shaft (14A) further comprises a plunger piston (14B) securely fastened to a front end thereof, the plunger piston (14B) is movably positioned within the front body (12F);

C) a handle (16) which comprises a handle housing (16A) with a handle trigger (16B) pivotally positioned therein, the handle housing (16A) comprises a handle housing right (16AR) connected to a handle housing left (16AL) by a handle housing rear (16AC), the handle housing right (16AR) comprises a handle housing right top (16ARA) securely attached to a bottom surface of the back body (12B), the handle housing right (16AR) further comprises a handle housing right front (16ARB) having a handle housing right front opening (16ARBA) therein, the handle housing left (16AL) comprises a handle housing left top (16ALA) securely attached to a bottom surface of the back body (12B), the handle housing left (16AL) which further comprises a handle housing left front (16ALB) having a handle housing left front opening therein, the handle trigger (16B) comprises a handle trigger top (16BA) having a handle trigger top ratchet receptacle (16BAA) and a handle trigger top opening (16BAB) therein, the handle trigger (16B) further comprises a handle trigger bottom (16BB), a handle trigger rear (16BC) having a handle trigger rear opening (16BCA) therein and a handle trigger ratchet stopper (16BD) positioned at a top end thereof;

D) a ratchet (18) which comprises a ratchet rotator (18A) rotatably positioned within the handle trigger top ratchet receptacle (16BAA), the ratchet (18) further comprises a ratchet shaft (18B) attached at a rear distal end to the ratchet rotator (18A) extending outwardly therefrom, the ratchet shaft (18B) comprises a ratchet shaft opening (18BA) therein, a ratchet pushing member (18C) is attached to a rear distal end of the ratchet shaft (18B), a ratchet locking member (18D) is attached to and extends acutely downwardly from the ratchet pushing member (18C);

E) a handle trigger upper spring (16C) is positioned within the handle trigger top opening (16BAB) and the ratchet shaft (18B), the handle trigger upper spring (16C) functions to push the ratchet (18) upwardly when the handle trigger (16B) is released;

F) a handle trigger lower spring (16D) is positioned within the handle trigger rear opening (16BCA) and the handle housing rear (16AC), the handle trigger lower spring (16D) functions to push the handle trigger (16B) in an outward and released position, when the user squeezes the handle trigger (16B), the handle trigger top (16BA) pushes on top of the ratchet shaft (18B) engaging the ratchet pushing member (18C) into the plunger shaft teeth (14AA) advancing the plunger (14) and concurrently the butter stick (20) forward extruding through the body tip opening (12CB), when the user releases the handle trigger (16B), the handle trigger upper spring (16C) pushes upwardly on the ratchet shaft (18B) disengaging the ratchet pushing member (18C) from the plunger shaft teeth (14AA) and concurrently engaging the ratchet locking member (18D); and G) a handle trigger pivot pin (16E) is positioned within the handle trigger (16B), the handle housing right front opening (16ARBA), and the handle housing left front opening, the handle trigger pivot pin (16E) functions to pivotally connect the handle housing (16A) to the handle trigger (16B).

2. The stick applicator (10) as described in claim 1, wherein the back body (12B) comprises a back body opening (12BA) through which the plunger shaft rear (14AB) protrudes.

3. The stick applicator (10) as described in claim 1, wherein the front body (12F) comprises a front body fastening means (12FA) positioned at a front distal end thereof.

4. The stick applicator (10) as described in claim 3, wherein the body tip (12C) comprises a body tip fastening means (12CA) positioned at a rear distal end thereof, the body tip fastening means (12CA) has a complimentary configuration to the front body fastening means (12FA) functioning to engageably attach thereto.

5. The stick applicator (10) as described in claim 1, wherein the plunger piston (14B) further comprises a plunger piston ring (14BA) circumferentially positioned thereon, the plunger piston ring (14BA) functions to form a seal between the plunger piston (14B) and an inside of the front body (12F).

6. The stick applicator (10) as described in claim 1, wherein the handle housing (16A) comprises a handle housing bottom (16AB).

7. The stick applicator (10) as described in claim 1, wherein the handle trigger rear (16BC) further comprises a handle trigger rear stopper (16BCB) which functions to prevent the handle trigger (16B) from fully receding into the handle housing (16A).

8. The stick applicator (10) as described in claim 1 is manufactured from a material selected from a group consisting of plastic, plastic composite, metal, metal alloy, rubber, rubber composite, epoxy, fiberglass, and carbon-graphite.

9. The stick applicator (10) as described in claim 1, wherein the handle trigger rear opening (16BCA) is at an acute angle.

10. The stick applicator (10) as described in claim 9, wherein the acute angle is thirty degrees.

11. The stick applicator (10) as described in claim 1, wherein the body tip (12C) is angled acutely downwardly toward the body tip opening (12CB).

12. The stick applicator (10) as described in claim 11, wherein the angle of the body tip (12C) is thirty-five degrees.

13. The stick applicator (10) as described in claim 1, wherein the body tip opening (12CB) is rectangular in configuration.

14. The stick applicator (10) as described in claim 1, wherein the handle housing right top (16ARA) is at a perpendicular angle to the handle housing left front (16ALB) and the handle housing left top (16ALA) is at a perpendicular angle to the handle housing left front (16ALB).

15. The stick applicator (10) as described in claim 7, wherein the handle trigger rear stopper (16BCB) is constructed from a material selected from a group consisting of plastic, plastic composites, rubber and rubber composites.

* * * * *